Patented Sept. 2, 1947

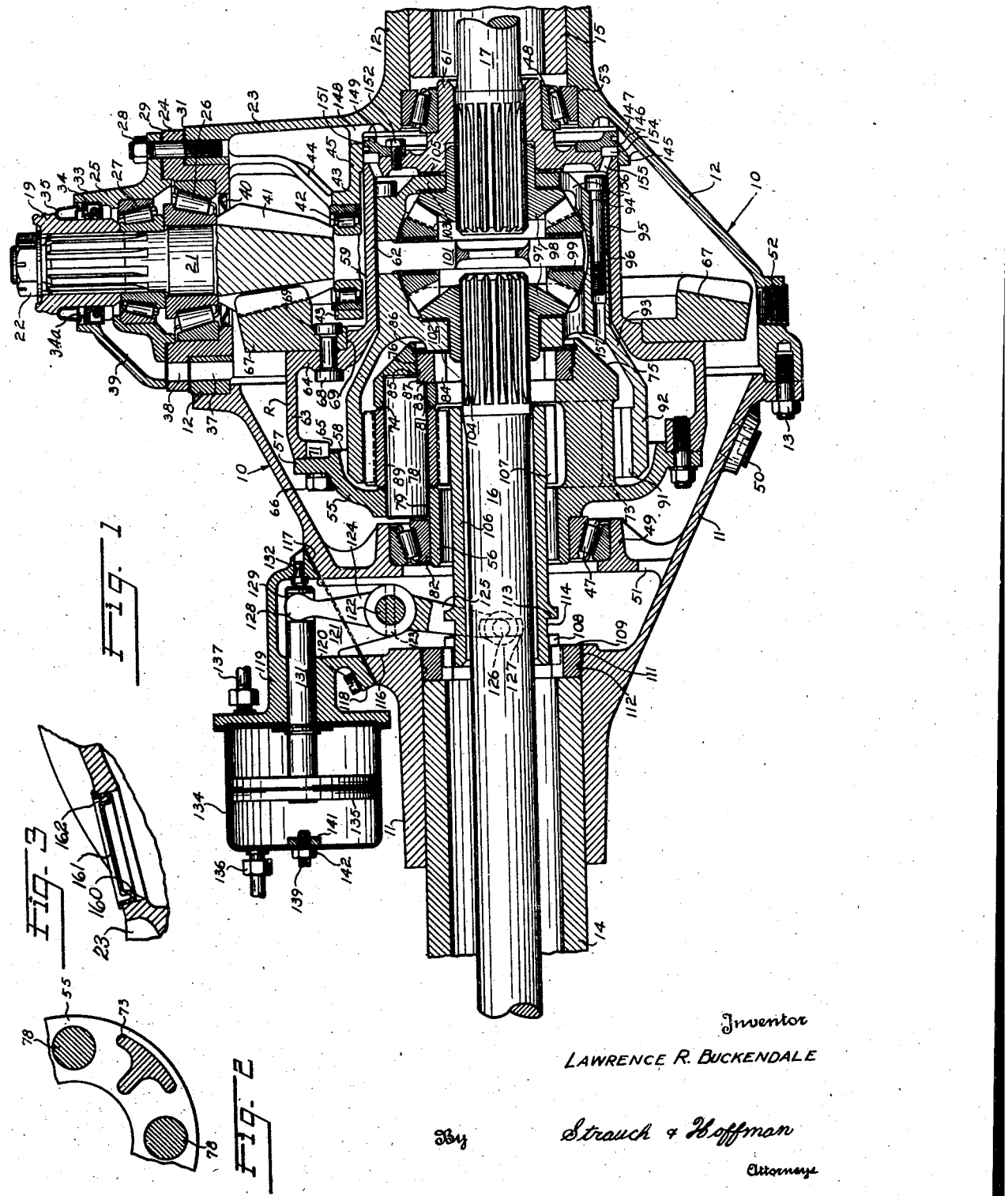

2,426,593

UNITED STATES PATENT OFFICE 2,426,593

MULTISPEED DRIVE AXLE

Lawrence R. Buckendale, Detroit, Mich., assignor to The Timken-Detroit Axle Company, Detroit, Mich., a corporation of Ohio Application April 29, 1943, Serial No. 485,052

13 Claims. (Cl. 74—314)

1

The present invention relates to multi-speed drive axles, more particularly automotive drive axles of the planetary overdrive type, although it is not limited to such use, since certain features are applicable to other classes of axles.

While axles of this general character have been heretofore proposed and have gone into rather wide use, especially in the pleasure car field, they are open to the disadvantages of being bulky, making it necessary to employ a somewhat oversize housing to accommodate their parts; many of them are of complicated costly design, embodying parts which do not stand up in use and require specially trained men to service them, and all of them are difficult to shift from one ratio to another.

It is the primary object of this invention to provide a novel planetary drive axle which overcomes all of the foregoing disadvantages, is of simple, low cost, compact design and yet is of rugged, durable construction, and also possesses additional advantages over the drive axles of the prior art.

Another important object is to provide a planetary drive axle in which the rotor is so designed that it may be made of cast metal and riveted to the ring gear, and yet achieves a structure making it possible to employ a bevel gear having an overall diameter which is less than that of a forged assembly.

Another object is to provide a planetary drive axle embodying novel direct drive lock-up and geared drive gear assemblies, which are of equal size and pitch and interchangeable, simplifying installation and replacement.

A further object is to provide a planetary drive axle, in which the shift into geared speed is made by coupling the quill to a stationary part of the device and the shift into direct speed is made by coupling the quill to a rotating part of the device, with coacting clutch teeth having smooth end faces so designed that when they are engaged in a gear shifting operation, and pressures having magnitudes bearing predetermined relationship to certain gear factors are applied, the confronting tooth ends will smoothly slide upon each other and prevent intermeshing until synchronization is substantially complete, and will then permit the teeth to mesh and bring the axle into the selected ratio without clash or jerk.

Another object is to provide a planetary drive axle with a novel carrier assembly embodying a one-piece carrier structure of simple, light weight design, affording adequate working spaces for the planet gears, and having novel means for

2 locking the planet shafts in place and restraining them against rotation, and yet achieving a rugged, durable carrier assembly.

My invention further aims to provide a planetary drive axle with a novel lubrication system which is operable to positively force lubricant axially through all of the working parts of the mechanism and insure adequate lubrication of the parts at all times.

A further object is to provide a novel unitary power-operated shifter assembly for multi-speed axles, adapted to be secured over an opening in the axle housing and constituting a complete unit containing all the working parts of the shifter assembly, making it unnecessary to fasten parts inside the axle housing or to give the axle housing a special shape.

Another object is to provide a novel pinion bearing and lubricant seal assembly and an inspection opening and closure assembly of novel simplified form.

Further subordinate objects will become apparent as the detailed description thereof proceeds in conjunction with the annexed drawings, and from the appended claims.

In the drawings:

Figure 1 is a horizontal sectional view through a planetary axle of the invention, certain parts being shown 90° out of their true positions, to simplify the disclosure;

Figure 2 is a fragmental sectional view through the carrier with the gears removed, showing the relationship of the planet shafts and struts; and Figure 3 is a fragmental sectional view showing the novel inspection opening and closure assembly of the invention.

With continued reference to the drawings, wherein like reference characters have been used to designate similar parts throughout the several views, the invention has been illustrated as applied to an automotive drive axle of the so-called "unit" type, embodying a housing having a bowl portion 10 made up of mating sections 11 and 12, secured together along a plane normal to the axis by means of stud and nut assemblies 13. It is to be understood, however, that the invention is equally applicable to "carrier" type axle constructions, in which all the working parts of the axle are incorporated in a carrier, which is bolted over an opening in the axle housing.

Housing bowl sections 11 and 12 receive, and are tightly secured to axle arms 14 and 15 respectively. Axle shafts 16 and 17 are rotatable in the axle arms and are connected to the vehicle wheels or other drive means in well known manner (not shown).

Primary reduction

Power is applied to the axle by means of a universal joint member 19 secured to a shaft 21 by means of a nut 22. Shaft 21 is journalled in a forward extension 23 of housing section 12 by means of bearing cages 24 and 25, carrying antifriction bearings 26 and 27 respectively, and secured to the housing by stud and nut assemblies 28. The inner bearing races are clamped between member 19 and a shoulder on the shaft. Shims, indicated at 29, may be interposed between the bearing cage flanges to secure the proper bearing adjustment, and further shims 31 may be interposed between bearing cage 24 and the housing, to secure the proper mating relationship of the gears, in a manner well understood in this art.

Frictionally fitting in a forward extension 33 of bearing cage 25, so as to obviate the need for special machining, is a seal 34, for minimizing lubricant escape from the front of the housing. A slinger 35 carried by member 19 serves to confine any lubricant escaping past flange 34a of the seal to the front lip of bearing cage extension 33, and prevents it from being thrown outwardly.

Aligned passages 37, 38 and 39, formed in housing section 12 and bearing cages 24 and 25 respectively, serve to conduct lubricant, thrown from the rotor into the open end of passage 37, forwardly to the space between seal 34 and bearing 27, from which it gravitates through the bearings and is returned to the body of lubricant in the housing. A flanged member 40 fitting in cage 24 controls the rate of lubricant return flow. Shaft 21 preferably is provided with an integral gear 41 of either the hypoid or bevel type, as may be desired, and the rear end of the shaft is additionally supported in an outboard bearing 42 carried in a support 43, the latter being supported by legs 44 integrally formed with the housing and a cylindrical member 45 which forms part of the lubrication system, to be described later.

Planetary mechanism

Mounted for rotation concentric with the axle shafts in bearings 47 and 48 is a rotor R. Bearing 47 is carried in a web-like bearing support 49, preferably integrally formed with housing section 11 and having a lubricant return passage 51, for returning lubricant to the bowl. It is to be understood that port 51 is shown disposed 90° out of position, as in the actual construction it is disposed at the bottom, or directly below shaft 16. The same is true of the lubricant drain plug 52 of housing section 12. Lubricant filler plug 50 is shown substantially in its correct position in this figure. Bearing 48 is mounted in a seat 53 formed directly in housing section 12.

Rotor R is of novel construction, it having been found that by making it in two parts, and giving the rotor sections the configurations shown, it is possible to construct both parts of castings and yet make it possible to efficiently rivet the bevel gear in place on the rotor.

Rotor section 55 is of generally cup shape and has a hub portion 56 journalled in bearing 47, a radial bolting flange 57, and a pilot surface 58. Rotor section 55 supports the planet shafts in novel manner, to be hereinafter described.

Rotor section 59 has a hub portion 61 journalled in bearing 48; a small diameter portion 62, housing the differential mechanism; a large diameter portion 63 joined to the small diameter portion by a substantially radial web portion 64, and terminates in an inwardly directed flange 65, which is piloted on surface 58 and is secured to bolting flange 57 of the mating rotor section by cap screws 66 or the like.

As seen in Figure 1, a bevel ring gear 67 is rigidly secured to web portion 64 of the rotor by means of a plurality of rivets 68, and is accurately located on the rotor by pilot surface 69. In order to facilitate riveting the parts, notches 71 are provided in flange 65 opposite each rivet opening, of sufficient size to permit the riveting tool to be lined up with each rivet.

From the foregoing it is apparent that input or pinion shaft 21 is mounted for accurate rotation in the housing and constantly drives the bevel gear 67, and the latter is supported in extremely stable manner on the rotor, being backed up axially by the large radial face of web 64 and accurately centered by pilot surface 69. While the rotor is of cast metal, it is extremely strong and is of unusually compact construction, by reason of the manner in which the bolting flanges 57 and 65 are offset axially toward the center of the housing. Moreover, by giving section 63 of the rotor a large diameter, and locating the rivets within the enlarged diameter portion, the bevel gear may be of small diameter and yet is efficiently supported and backed up at all times.

Referring to Figures 1 and 2, rotor section 55 is provided with a plurality of axially extending struts 73, of generally T-shape in cross section, disposed with one leg extending radially and the other tangentially, and they are joined to an annular or ring-like integral portion 74, having a conical end 75 and an inwardly directed seat 76, concentric with the rotor axis. A plurality (preferably four) of planet shafts 78 are mounted in aligned openings 79 and 81 provided in rotor section 55 and ring portion 74 respectively. As seen in Figure 2, the planet shafts are disposed intermediate each pair of struts 73.

As seen in Figure 1, the inner race 82 of bearing 47 limits endwise movement of shaft 78 to the left. Movement of the planet shaft in the opposite direction is limited by a ring member 83 tightly fitting in seat 76, bores 81 in the carrier intersecting seat 76, as seen in Figure 1. Ring member 83 is provided with internal teeth 84, and it will therefore be hereinafter termed a clutch ring. It is preferably installed in seat 76 by giving it a diameter slightly greater than seat 76; cooling it, as for instance by inserting it in Dry Ice, so as to thermally contract it; and then forcing it into place in the seat 76, in snug engagement therewith, so that after normalizing it will expand and tightly grip the seat so securely as to render it unnecessary to employ splines or other keying means for insuring synchronous rotation with the carrier. In order to prevent burrs or chips from interfering with intimate seating of clutch ring 83, it is preferably provided with an external chip groove 85, into which any chips will be received. If desired, a split ring 86 may be sprung into a groove in ring portion 74, as a safety measure to prevent the clutch ring from shifting axially, should it come loose or break during operation.

As seen in Figure 1, by providing each planet shaft with a notch 87, so that they may fit over the clutch ring as seen in Figure 1, the ring is operable to restrain the shafts against rotation and also will limit endwise movement of the shafts to the right in Figure 1.

Journalled on each planet shaft is a planet gear 89, which constantly meshes with a sun gear (to be hereinafter described) and with an internal gear 91, which is preferably integrally formed with the large diameter portion 92 of the left-hand section of a two-part differential housing 93 operatively supported on axle shafts 16 and 17. The other half 94 of the differential housing is secured to section 93 by cap screws 95, along a mating plane 96. Splined on the ends of axle shafts 16 and 17 are differential side gears 97 and 98 respectively, which mesh with spider gears 99 carried by a spider 101, the latter being clamped between the two halves of the differential casing.

Endwise movement of the differential casing within the rotor is limited by inwardly directed webs 102 and 103 formed on the differential casing sections 93 and 94 respectively. Movement to the left is limited by through engagement of web 102 with a bushing 104 bearing against the side of ring 83, while movement to the right is limited by web 103 engaging a bushing 105 abutting the right-hand end face of the rotor. Endwise movement of side gears 97 and 98 is limited by engagement of webs 102 and 103, with the backs of the gears, suitable bushings being employed to reduce wear, in well known manner.

The differential casing is accordingly mounted for free rotation within the rotor and is capable of undergoing only limited endwise movement, and it divides the power equally between axle shafts 16 and 17 in a manner well understood in this art. The unit is so controlled by the novel mechanism of the invention as to give either an overdrive or a direct drive between the rotor and the axle shafts, in the manner now to be described.

Mounted for endwise shifting movement, and for rotation concentric with the rotor axis, is a sleeve 106 carrying a sun gear 107 at one end, which constantly meshes with planet gears 89. The outer end of sleeve 106 is provided with teeth 108, and it is preferably provided with the same number of teeth, and has the same pitch as sun gear 107. Teeth 108 cooperate with internal teeth on a stationary ring 109, which is preferably of identical size and shape as ring 83, and is expanded into tight frictional locking engagement with a seat 111 in housing section 11 in a manner similar to ring 83. A chip groove 112 is provided on the ring periphery, and the ring is preferably pushed into abutting engagement with the end of axle arm 14, so as to locate it in predetermined axial position. Also provided on sleeve 106, in spaced relationship to ring 108, is a flange 113, which cooperates with teeth 108 to define a shifter yoke groove 114.

By shifting sleeve 106 into engagement with ring 109, as shown in Figure 1, the device may be placed in the overdrive ratio, and by shifting the sleeve to mesh sun gear teeth 107 with the teeth 84 of ring 83, the planetary mechanism may be "locked up" and the device placed in direct or one-to-one drive, as will be hereinafter pointed out.

Shifter mechanism

The axle of the invention is also provided with a novel compact, efficient power shifter mechanism, which requires a minimum of space and carries all of the parts in a unitary casing structure which is readily attached to or removed from the axle housing.

Referring to Figure 1, housing section 11 is provided with a recess 116 terminating at the surface of the housing in a boss providing an inclined bolting face 117, to which the flange base 118 of a power actuator assembly 119 is secured by screws 120. Unit 119 carries a pair of arms 121 projecting downwardly into recess 116 and terminating at their lower ends in shaft supporting portions. Mounted in the lower ends of arms 121 is a shaft 122, being secured against rotation in one arm by means of a pin 123. Journalled on shaft 123 is a lever 124, having a forked lower end 125. Pivoted in each arm of the fork 125, on a pin 126, is a block 127, which fits into shifter groove 114. The parts just discussed constitute a shifter yoke operable to shift sleeve 106 axially in either direction when lever 124 is rocked.

The upper end of lever 124 is provided with a flat head 128, whose edges are rounded so as to cooperate in rocking engagement with the walls of a notch 129 provided in a shifter rod 131. The latter is mounted for reciprocation in body 119, and movement thereof to the right is limited by a plug 132, seating in an opening aligned with the rod. Recess 129 has a depth approximately equal to the radius of rod 131, with the result that the flat side face of lever portion 128 restrains the rod against any substantial rotation about its axis.

Rod 131 may be reciprocated by any suitable power or manual means, but I preferably employ a double-acting vacuum assembly embodying a cylinder 134 and a double-acting piston 135. Conduits 136 and 137 secured to opposite ends of the cylinder lead to any suitable source of vacuum or fluid pressure, for actuating the assembly. For instance, if a source of vacuum is connected to conduit 137, rod 131 will be held in the position shown in Figure 1, and through lever 124 will hold sleeve 106 in the position shown, so as to cause the axle to operate in the overdrive ratio. By applying the vacuum to conduit 136 and venting conduit 137 to the atmosphere, the piston and rod will be pulled to the left, which, through lever 124, will shift sleeve 106 to the right, so as to bring sun gear 107 into engagement with ring gear 83, and "lock up" the planetary unit or place it in direct drive. Movement of rod 131 to the left is limited by a stop screw 139 threaded into a member 141, welded to the inside wall of the cylinder, and locked in adjusted position by a lock nut 142. By threading screw 139 in or out the stop position of rod 131 may be accurately adjusted. It is to be understood that when it is properly adjusted, sleeve 106 will be stopped before it engages the hub of differential side gear 97, so as to avoid frictional wear of the parts.

Lubrication

The drive axle of the invention also embodies novel lubrication means which will now be described. Provided on the interior of housing section 12 is an annular flange 145, which is preferably integral with the housing and at its forward side merges into support 45 for the outboard bearing. Flange 145 is provided with a smooth internal surface 146 and a number of openings 147 and 148, it being understood that opening 147 is disposed 90° out of position, being disposed directly below axle shaft 17 in the actual construction, so as to lie below the normal lubricant level in the housing and feed lubricant into the space behind flange 145 and onto surface 146.

Cooperating with surface 146 is a ring 149 having one or more helical grooves 151 in its periphery forming, in effect, an Archimedean pump.

Ring 149 is secured to the rotor in any suitable manner, as for instance by cap screws 152, and is also provided with a recess cooperating with a similarly shaped recess in the rotor, to define a lubricant collecting groove 154, which communicates with a plurality of ducts 155 in the rotor.

In response to rotation of the rotor, the lubricant passing through openings 147 is propelled into collecting groove 154 by the shear action of the Archimedean pump and is fed under pressure through a plurality of passages 155 into the rotor interior. It should be here noted that this is an important feature of this invention. In the prior art, as far as is known, the feeding of the oil to the rotor has been dependent on impact velocity rather than shear. At higher speeds the "paddle" action was and is quite satisfactory. However, in a heavy-duty axle of this type where heavy loads are often carried at lower speeds this type of feed is inadequate, as the "paddle" action which is dependent on the speed of the rotor is not sufficient to pump an adequate volume of oil.

The Archimedean pump assembly of the present invention on the other hand has been found to efficiently pump lubricant at low as well as high rotor speeds, thereby making it possible to adequately lubricate heavy-duty slow speed axles. In the lubrication system of the invention the lead angle of the pump, of course, determines the volume of oil pumped. Thus the amount of lubrication may be nicely controlled for a given construction by incorporating the proper lead angle.

A portion of the lubricant thus pumped into the rotor through passages 155 passes through a plurality of openings 156 into the interior of the differential casing, thereby efficiently lubricating the differential mechanism. The remainder passes axially along the narrow annular space between the small diameter portions of the rotor and differential casing. Lubricant passes out of the differential casing through a plurality of ports 157 into the enlarged diameter portion 92 of the differential casing, where it is propelled outwardly by centrifugal force, passing outwardly over internal gear 91, thereby efficiently lubricating it. Also, a part of the lubricant introduced into the differential casing and a part of the lubricant, feeding out of ports 157 finds its way into and lubricates the axle shaft splines and the planetary gearing. The lubricant spills outwardly over the left hand end of the internal gear and builds up an annular body of lubricant in the enlarged diameter portion of the rotor. When the rotor casing has been filled to a predetermined annular depth, the lubricant finds its way out through the interior of hollow hub section 56 of the rotor. It is understood that an annulus of apertures may be provided in the rotor portion 55 to provide an outlet for the oil if desired. This annulus of apertures will determine the size of the annulus of oil induced by centrifugal force at higher rotor speeds. Adequate lubrication is maintained at all speeds, as at higher speeds the splash and surge of the oil in the housing 12 introduces a greater volume of lubricant to the pump which positively forces it through the differential and rotor housing. The rotor and differential casings are accordingly maintained filled to a sufficient annular depth with lubricant to provide adequate lubrication of all the parts when the mechanism is in operation.

Operation

Assuming that the parts are in the positions shown in Figure 1, power applied to shaft 21 causes pinion 41 to drive bevel ring gear 67 at a predetermined speed reduction. Rotation of the rotor causes planets 89 to undergo a planetating action inasmuch as sleeve 106 and sun gear 107 are locked in stationary condition by engagement of ring 109 and teeth 108. Planets 89 accordingly planetate about stationary sun gear 107, resulting in internal gear 91 being driven at a speed greater than the rotor, the exact overdrive ratio depending upon the gear sizes selected to give the operating characteristics desired. The power so transmitted to the differential casing is distributed equally between axle shafts 16 and 17 by the differential mechanism in well known manner.

Assuming now that the power actuator is operated so as to rock lever 124 counterclockwise and move sleeve 106 to the right, I have found that by providing the end faces of the teeth of sun gear 107 and clutch ring teeth 84 with smooth end faces joining the working faces of the teeth along sharp rather than chamfered corners; locating the end faces of the teeth in parallel surfaces of revolution generated by rotating parallel lines about the axis of the gears; providing a predetermined degree of backlash between the teeth of the mating gears; and employing shift forces of predetermined magnitudes, it is possible to energize the power operator in advance of actually making the shift, and thereafter, upon merely interrupting the delivery of power, without disengaging the vehicle clutch, as for instance by momentarily releasing the accelerator, sleeve 106 will be promptly pulled into a neutral position, with the ends of sun gear teeth 107 smoothly sliding upon the end faces of the teeth of ring 84, and that thereafter, upon substantial synchronization of the parts, the vacuum operator will promptly pull the gears into mesh without shock or clash. The sharp corners of the teeth, coupled with the facts that they have smooth end faces which ride in frictional engagement during the synchronizing operation and a limited degree of backlash is employed, which does not provide spaces large enough for the power operator under the predetermined shifting pressure to bring the parts into mesh prior to substantial synchronization, mutually cooperate to provide an easily shiftable mechanism.

Accordingly, in the foregoing shift operation into direct drive, it is merely necessary to momentarily release the accelerator, to allow the vacuum operator to pull the parts out of the overdrive ratio shown, and thereafter to momentarily depress the accelerator to bring the parts up to the speeds required to synchronize them, at which time the gears will silently mesh in direct drive.

The confronting ends of the teeth 108 and the teeth of stationary ring 109 are also provided with smooth faces disposed in parallel surfaces of revolution so that the shift out of direct drive into the overdrive radio may be also carried out easily without jerk or clash. Therefore, if it is desired to shift out of the direct drive ratio just described, into the overdrive ratio shown in Figure 1, it is merely necessary to energize the vacuum operator by connecting line 137 to vacuum; and momentarily release the accelerator, as the slowing down of the engine will synchronize the parts and allow the vacuum operator to bring them into mesh without shock or clash.

United States Letters Patent No. 2,398,407 issued April 16, 1946, to Nelson R. Brownyer for Power transmission mechanism may be referred to for a full disclosure of the specific tooth lengths, tooth end face areas, backlash and the shift pressures which have been found successful in achieving an easy shift operation.

In Figure 3 there is disclosed a novel peep hole cover assembly forming part of the invention. I have found that by providing a simple cored opening 160 in the upper portion of housing section 11, above the lubricant level and mounting a simple sheet metal cover 161 over the opening, with a flange 162 frictionally engaging the walls thereof a cover assembly is provided which may be readily removed for inspection by prying it off, much in the same manner as removing a conventional paint can cover, thereby saving the expense of machining, boring and tapping for a bolted cover.

The peep hole is located above the lubricant level so it is not necessary that it be absolutely fluidtight. However, leakage through any small opening between the cover flange and the walls of the housing opening, of lubricant thrown from the rotating parts during operation, is prevented by the inner wall of the flange, which exerts a baffling action upon the thrown lubricant.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmitting mechanism, a housing; a rotor having axially spaced hub portions journalled in anti-friction bearings in said housing; a plurality of shafts mounted in openings in said rotor adjacent one of said anti-friction bearings and adapted to abut the inner race thereof when said shafts are shifted endwise a predetermined distance in one direction; an annular portion on said rotor supporting the other ends of said shafts; a planet gear journalled on each shaft; a clutch ring carried by said annular portion and operable to limit endwise movement of said shafts in the opposite direction; and a sun gear mounted for rotation in said housing and adapted to be meshed with said planets and said clutch ring.

2. The power transmitting mechanism defined in claim 1, wherein said clutch ring and said shafts are provided with coacting means operable to prevent rotation of said shafts about their axes in all endwise shifted positions thereof.

3. In a planetary multiple speed mechanism, in sub-combination, a planet carrier, a plurality of parallel, circularly spaced planet shafts mounted in axially spaced groups of openings in said carrier, one of said groups of openings communicating with an annular seat provided on said carrier; and a toothed ring tightly fitting said annular seat and cooperating in abutting relationship with said shafts, to limit endwise movement thereof in one direction; and means, cooperating in abutting relationship with the other ends of said shafts, for limiting endwise movement thereof in the opposite direction.

4. The mechanism defined in claim 3, wherein each of said shafts is provided with a notch which receives a portion of said ring, whereby the latter is also operable to restrain said shafts against rotation about their axes.

5. The mechanism defined in claim 3, wherein said annular seat faces inwardly and said ring has internal clutch teeth and an outer periphery projecting outwardly beyond the radially inward portions of said shafts and an end face disposed in a plane intersecting said one group of openings.

6. The mechanism defined in claim 3, wherein said annular seat faces inwardly and said ring comprises an internally toothed clutch ring shrunk into and expanded outwardly into tight frictional locking engagement with said annular seat.

7. In a multi-speed drive axle, an axle housing having oppositely disposed axle arms; an axle shaft rotatable in each axle arm; a rotor journalled in said housing; means for driving said rotor; a casing in said rotor; and a planetary gear mechanism for transmitting power from said rotor to said axle shafts, comprising a plurality of planet gears rotatably carried by said rotor and constantly meshing with an orbit gear carried by said casing; an axially shiftable quill carrying a sun gear at one end meshable with said planet gears and carrying teeth at the other end, said quill carried teeth being the same in number and pitch as the teeth of said sun gear; an inwardly facing annular seat in said housing adjacent the teeth of said quill and an inwardly facing annular seat in said rotor of identical diameter with said first seat; and a pair of substantially identical internally toothed rings tightly fitting said first and second-named seats and meshable with the quill and sun gear teeth respectively.

8. In a drive axle having a gear housing and a pair of axle arms fitting in aligned openings in the said housing, an axle shaft rotatable in each axle arm, a rotor journalled in said housing; and a planetary gear mechanism for transmitting power from said rotor to said axle shafts, comprising a clutch ring tightly fitting into one of the openings of said housing and abutting the end of one of said axle arms.

9. In a drive axle, a housing having oppositely disposed axle arms containing axle shafts; an input shaft journalled in said housing; a multiple speed gear mechanism in said housing for transmitting power from said input shaft to said axle shafts, comprising a speed ratio selecting member mounted for axial shifting movement in said housing; an opening in said housing adjacent said member; a casing fitting over said opening and having support means projecting through said opening into said housing; a lever device pivoted on said support means and disposed within said housing and said casing and operably connected to said shiftable member; and power operated means, enclosed by said casing and operably connected to said lever device, for shifting said member.

10. In change speed drive mechanism, a housing, a rotor mounted within the housing and multiple speed power transmitting mechanism within the rotor, said mechanism including an axially shiftable speed ratio selecting member having a sun gear at one end, a plurality of planet gears in mesh with said sun gear, a supporting shaft for each planet gear, and means for mounting said shafts in the rotor against axial or rotative movement relative thereto, comprising means fixed to the rotor and coacting with the respective shafts and having parts thereof intermeshing with the teeth of said sun gear when said selecting member is shifted to one position to establish a selected driving speed ratio.

11. The change speed drive mechanism defined in claim 10, in which said last named means is an internally toothed ring fixed to the rotor in abutting contact with one end of said gear supporting shafts.

12. In planetary drive axle mechanism, a rotatable planetary gear carrier, a plurality of circumferentially spaced shafts arranged concentrically with the axis of rotation of said carrier, a locking member on one end of said carrier formed cooperatively with adjacent ends of said shafts for locking said shafts against rotation relative to said carrier, planet gears rotatable on said shafts, a shiftable sun gear meshed with said planet gears, and internal teeth on said locking member adapted to be engaged by said shiftable sun gear.

13. In the planetary drive axle mechanism defined in claim 12, means providing an annular seat in said one end of said carrier, and said locking member comprising an annular insert rigidly mounted in said seat, the ends of said shafts being notched to lock with the adjacent portions of said annular insert.

LAWRENCE R. BUCKENDALE.

REFERENCES CITED

The following references are of record in the file of this patent:

UNITED STATES PATENTS

| Number | Name | Date |
|---|---|---|
| 2,251,956 | Raven | Aug. 12, 1941 |
| 742,812 | Winton | Oct. 27, 1903 |
| 1,106,149 | Loomis | Aug. 4, 1914 |
| 1,497,845 | Evans | June 17, 1929 |
| 1,730,900 | Rockwell | Oct. 8, 1929 |
| 1,530,205 | Ruckstell | Mar. 17, 1925 |
| 1,815,689 | Wiedmaier | July 21, 1931 |
| 1,965,266 | Starr | July 3, 1934 |
| 2,001,337 | Wiedmaier | May 14, 1935 |
| 2,056,303 | Starr | Oct. 6, 1936 |
| 2,068,438 | Starr | Jan. 19, 1937 |
| 2,071,165 | Harper | Feb. 16, 1937 |
| 2,015,108 | Harper | Sept. 24, 1935 |
| 2,147,145 | Carlson | Feb. 14, 1939 |
| 2,147,146 | Carlson | Feb. 14, 1939 |
| 2,178,900 | Starr | Nov. 7, 1939 |
| 1,956,236 | Hughes | Apr. 24, 1934 |
| 1,895,288 | Larsh | Jan. 24, 1933 |
| 2,004,440 | Kazenmaier | June 11, 1935 |
| 1,085,262 | Janney | Jan. 27, 1914 |
| 1,820,061 | Flagg | Aug. 25, 1931 |
| 1,968,604 | Hertz | July 31, 1934 |
| 2,225,720 | Snow | Dec. 24, 1940 |
| 2,263,937 | Taylor | Nov. 25, 1941 |
| 1,537,434 | Gald | May 12, 1925 |
| 1,664,575 | Staples | Apr. 3, 1928 |
| 1,511,530 | Starr | Oct. 14, 1924 |
| 1,815,688 | Wiedmaier | July 21, 1931 |
| 1,964,956 | Lincoln | July 3, 1934 |